(12) United States Patent
Oppermann et al.

(10) Patent No.: US 12,736,106 B1
(45) Date of Patent: Sep. 15, 2026

(54) COUNTERBALANCER ASSEMBLIES FOR ENGINES

(71) Applicant: Brunswick Corporation, Mettawa, IL (US)

(72) Inventors: Alexander W. Oppermann, Slinger, WI (US); Daniel P. Hoffman, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 19/196,462

(22) Filed: May 1, 2025

(51) Int. Cl.
*F16F 15/26* (2006.01)

(52) U.S. Cl.
CPC .......... *F16F 15/267* (2013.01); *F16F 15/265* (2013.01)

(58) Field of Classification Search
CPC ................................ F16L 5/267; F16F 15/265
See application file for complete search history.

(56) References Cited

U.S. PATENT DOCUMENTS 4,236,496 A * 12/1980 Brownfield ........... F01C 11/004 123/238
6,439,188 B1 8/2002 Davis
8,020,528 B1 9/2011 Phillips
8,857,399 B2 * 10/2014 Colonna ............... F16F 15/265 123/192.2
2006/0102116 A1 * 5/2006 Maezuru ............... F02B 75/048 123/78 E
2011/0152020 A1 * 6/2011 Brind'Amour ....... F16H 63/062 474/8
2016/0131221 A1 * 5/2016 Okabe ................... F16F 15/267 123/192.2
2019/0048936 A1 * 2/2019 Todo ..................... F16C 27/066
2019/0360560 A1 * 11/2019 Sanders .................. F16H 19/02
2019/0377146 A1 * 12/2019 Borer ................... G02B 6/4431

* cited by examiner

*Primary Examiner* — Long T Tran
(74) *Attorney, Agent, or Firm* — Andrus Intellectual Property Law, LLP

(57) ABSTRACT

A counterbalancer for an engine, the counterbalancer having a housing, a first shaft and a second shaft each positioned within the housing such that the first shaft is configured to be rotated by the engine in use. A first gear and a first weight are each non-rotatably coupled to the first shaft and a second gear and a second weight are each non-rotatably coupled to the second shaft. The first gear and the second gear are meshed such that the first weight and the second weight rotate together to counterbalance the engine in use. The counterbalancer further includes roller bearings that rotatably support the first shaft and the second shaft within the housing and retainer clips that prevent axial movement of the bearings within the housing.

20 Claims, 12 Drawing Sheets

COUNTERBALANCER ASSEMBLIES FOR ENGINES

FIELD

The present disclosure relates to counterbalancer assemblies for engines.

BACKGROUND

The following are incorporated herein by reference, in entirety.

U.S. Pat. No. 6,439,188 discloses a four cycle four cylinder in-line internal combustion engine with a housing structure that contains two shafts that rotate in opposite directions to each other and at the same rotational velocity. Pairs of counterweights are attached to the two shafts in order to provide a counterbalance force which is generally equal to an opposite from the secondary shaking force which results from the reciprocal movement of the pistons of the engine. The rotational speed of the first and second shafts is twice that of the rotational speed of the crankshaft of the engine and the provision of counterweights on the first and second shafts balances the secondary forces caused by the reciprocal motion of the piston in the engine.

U.S. Pat. No. 8,020,528 discloses engine structure with a bedplate and an oil pan. The bedplate is configured to have an integrally formed balance shaft bearing support. A bearing cap is either a separate component or a component that is formed as an integral part of the oil pan. The bearing cap and the balance shaft bearing support structures are attachable to each other to capture the bearing portions of the balance shafts therebetween.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In certain independent and non-limiting aspects a counterbalancer for an engine is disclosed herein. The counterbalancer includes a housing, a first shaft and a second shaft each positioned within the housing, wherein the first shaft is configured to be rotated by the engine in use. A first gear and a first weight are each non-rotatably coupled to the first shaft and a second gear and a second weight are each non-rotatably coupled to the second shaft. The first gear and the second gear are meshed such that the first weight and the second weight rotate together to counterbalance the engine in use. The counterbalancer further includes roller bearings that rotatably support the first shaft and the second shaft within the housing and retainer clips that prevent axial movement of the bearings within the housing.

In independent aspects, the housing defines an opening through which the first shaft extends. The housing is inseparable about the opening such that the first shaft is insertable only axially within the opening. In other independent aspects, the housing defines an opening within which a first bearing of the bearings is positioned for rotatably supporting the first shaft. The housing is inseparable about the opening such that the first bearing is insertable only axially within the opening. In other independent aspects, the housing defines openings through which the first shaft extends. The first eight is coupled to the first shaft between the opening and this prevents the first shaft from being removed from the housing. In certain aspects, one of the openings is a blind opening such that the housing limits axial movement of one of the bearings in one direction.

In independent aspects, the housing is ferrous. In other independent aspects, the housing comprises non-ferrous alloy.

In independent aspects, an outer diameter of the first shaft is greatest where the first shaft extends through one of the roller bearings for rotatable support. In other independent aspects, the first shaft is rotatably supported within the housing by three roller bearings of the roller bearings and the second shaft is rotatably supported by two roller bearings of the roller bearings.

In independent aspects, a third gear is non-rotatably coupled to the first shaft and configured to be rotated by the engine to thereby rotate the first shaft in use. The housing is axially positioned between the third gear and the first gear. In certain aspects, the roller bearings include a ball bearing that rotatably supports the first shaft closer to the third gear than to the first gear and a cylindrical bearing that rotatably supports the first shaft closer to the first gear than to the third gear.

In independent aspects, the housing has a plurality of raised pads which are configured to oppose axial thrust forces from a face of the first gear towards the housing during acceleration and/or deceleration of the first shaft. In certain aspects, the plurality of raised pads of the housing and/or the face of the first gear have a reduced coefficient of friction relative to a surface adjacent thereto to thereby reduce friction between the plurality of pads and the face of the first gear.

In independent and non-limiting aspects, a counterbalancer for an engine is disclosed herein. The counterbalancer includes a housing, a first shaft and a second shaft each positioned within the housing, wherein the first shaft is configured to be rotated by the engine in use. A first gear and a first weight are each non-rotatably coupled to the first shaft and a second gear and a second weight are each non-rotatably coupled to the second shaft. The first gear and the second gear are meshed such that the first weight and the second weight rotate together to counterbalance the engine in use. The counterbalancer further includes roller bearings which rotatably support the first shaft and the second shaft within the housing. Outer diameters of the first shaft and the second shaft are greatest where the first shaft and the second shaft extend through the roller bearings, respectively.

In independent aspects, the housing is configured such that the roller bearings, the first shaft, and the second shaft are positionable therein only axially.

In independent aspects, a third gear is non-rotatably coupled to the first shaft and the third gear is configured to be rotated by the engine to thereby rotate the first shaft in use. The housing is axially positioned between the third gear and the first gear.

In independent and non-limiting aspects, a method for assembling a counterbalancer for an engine is disclosed herein. The method comprises axially inserting bearings into openings in a housing, coupling a first gear to a first shaft and a second gear to a second shaft, and axially inserting the first shaft and the second shaft into the housing and through the bearings after the first gear and the second gear are coupled thereto, respectively. The method then comprises coupling a first weight to the first shaft and a second weight to the second shaft when the first shaft and the second shaft are at least partially positioned within the housing and meshing the first gear and the second gear such that the first weight and the second weight rotate together to counterbalance the engine in use.

In independent aspects, the method further comprises coupling a third gear to the first shaft after the first shaft is inserted into the housing. The third gear is configured to be operatively coupled to the engine to rotate the first shaft therethrough. In certain aspects, the housing is axially positioned between the third gear and the first gear. In other independent aspects, the method further comprises coupling retainer clips to the housing after the bearings are inserted therein to prevent axial movement of the bearings.

BRIEF DESCRIPTION OF THE DRAWINGS

Examples are described with reference to the following drawing figures. The same numbers are used throughout to reference like features and components.

DETAILED DESCRIPTION

This present disclosure generally relates to counterbalancers for engines. Through experimentation and development, the present inventors have recognized problems with counterbalancers (also referred to simply as counterbalance assemblies) presently known in the art, including second-order counterbalancers. Existing systems have complicated housings comprised of at least two portions that close together, wherein the housing is then filled with oil that must be maintained therein. Substantial oil is needed, which the present inventors have recognized leads to windage losses. There is also significant sensitivity with respect to bearing radial fit and crush to fastener preload. Locational repeatability causes issues with offset between thrust surfaces, creating edge loading conditions, accelerating wear of the thrust surfaces. Additionally, this locational repeatability causes offset between mating halves of bearings that degrade the durability of the bearing. Existing counterbalancers are also sensitive with respect to thrust surfaces, and particularly locational repeatability between halves of housings.

Figure 1:
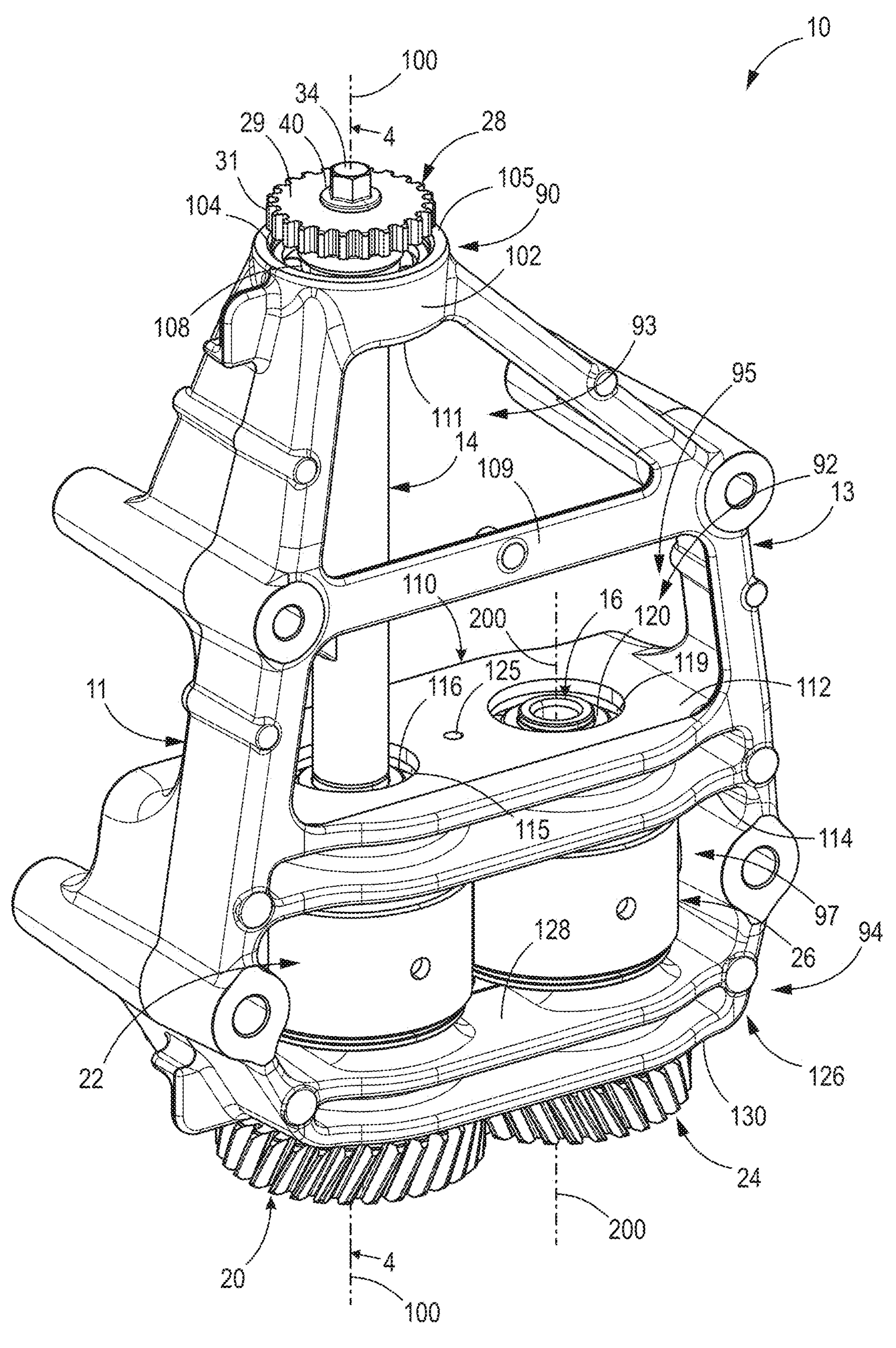
FIG. 1 is a perspective view of a counterbalancer according to the present disclosure.
Figure 2:
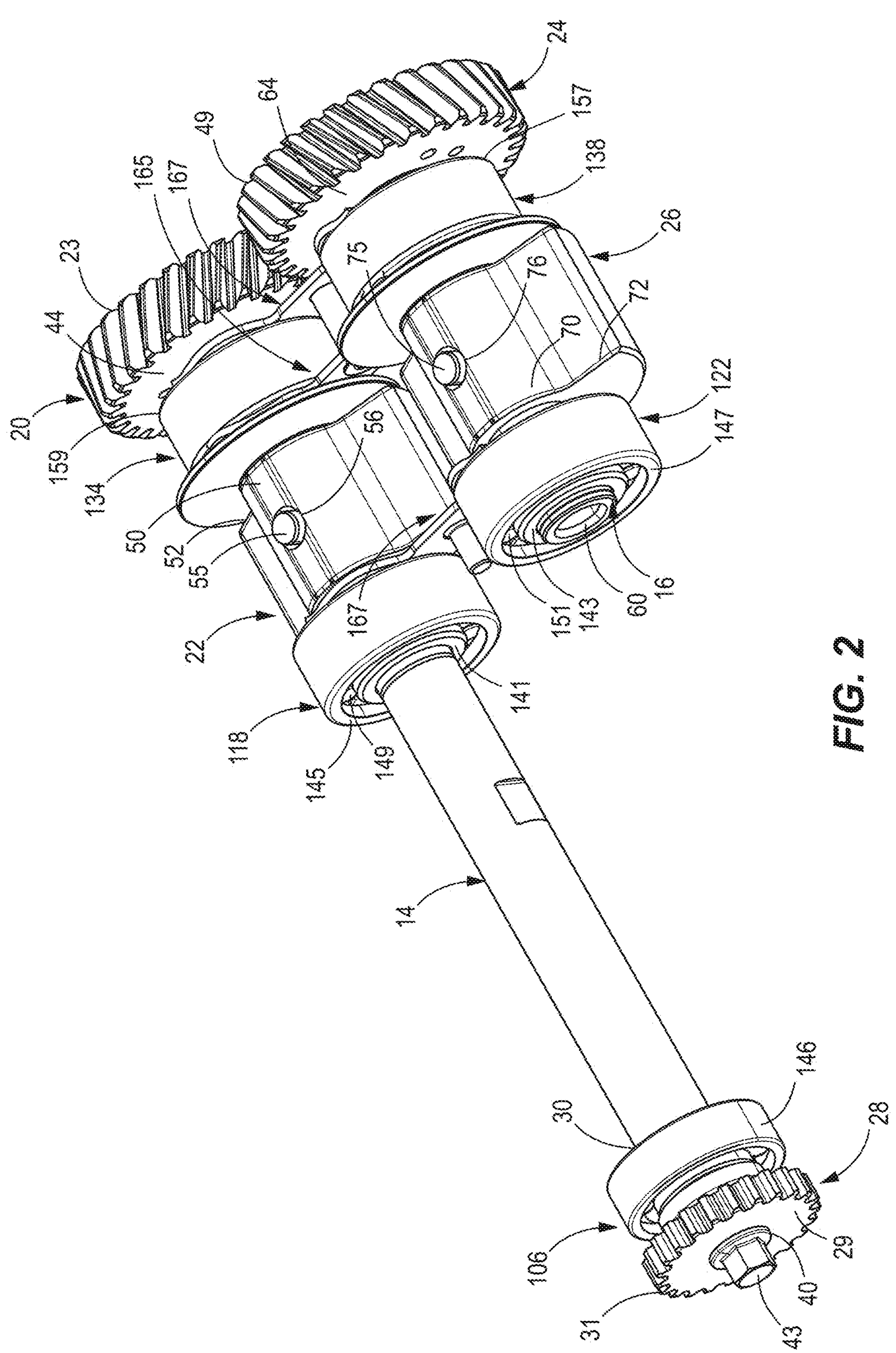
FIG. 2 is a section view showing a first and a second shaft supporting a first and a second weight of the counterbalance assembly.

The present inventors have developed new counterbalancers that eliminate these and other issues as highlighted above, and otherwise provide for reduced cost, improved durability, improved performance, and other benefits over counterbalancers known in the art. FIG. 1 shows a counterbalancer 10 according to the present disclosure, which has a single-piece housing 12 through which a first shaft 14 and a second shaft 16 extend. The first shaft 14 and the second shaft 16 are rotatably supported within the housing 12 via roller bearings 106, 118, 122, 134, 138, as shown in FIG. 2. The first shaft 14 is non-rotatably coupled to an input gear 28 at the first end 30 (shown in FIG. 4), a first output gear 20 at the second end 32 (shown in FIG. 4) and a first weight 22 positioned axially therebetween, here being closer to the second end 32 than to the first end 30 of the first shaft 14. The first shaft 14 extends through the housing 12 such that the housing 12 is positioned axially between the input gear 28 and the first output gear 20. The second shaft 16 is non-rotatably coupled to a second output gear 24 at the second end 32 and a second weight 26 positioned axially between the first end 30 and the second end 32. The roller bearings 106, 118, 122, 134, 138 are secured to the housing 12 via retainer clips 162, 165, 167, which are discussed in further detail below. As will become apparent, the present inventors have recognized that where the housing 12 is a single-piece, it is not possible to axially retain bearings relative to the housing via insets in the housing alone. In other words, at least one opening axially in the housing must be sufficiently sized so as to allow the bearing to be positioned therein, and thus the bearing may also exit this opening unless retained, such as by the retainer clips provided in accordance with the present disclosure.

Figure 3:
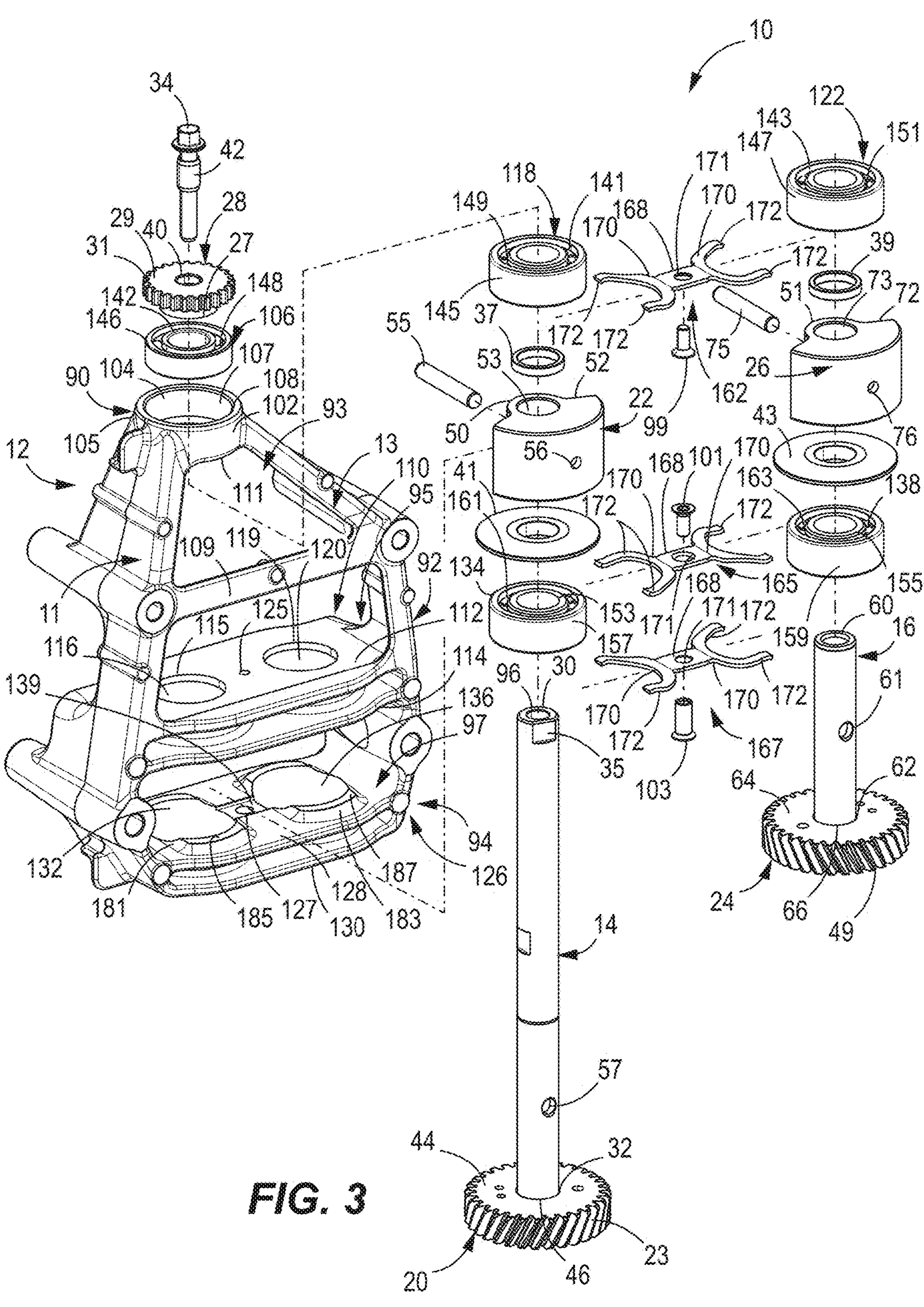
FIG. 3 is an exploded view of the counterbalancer.
Figure 4:
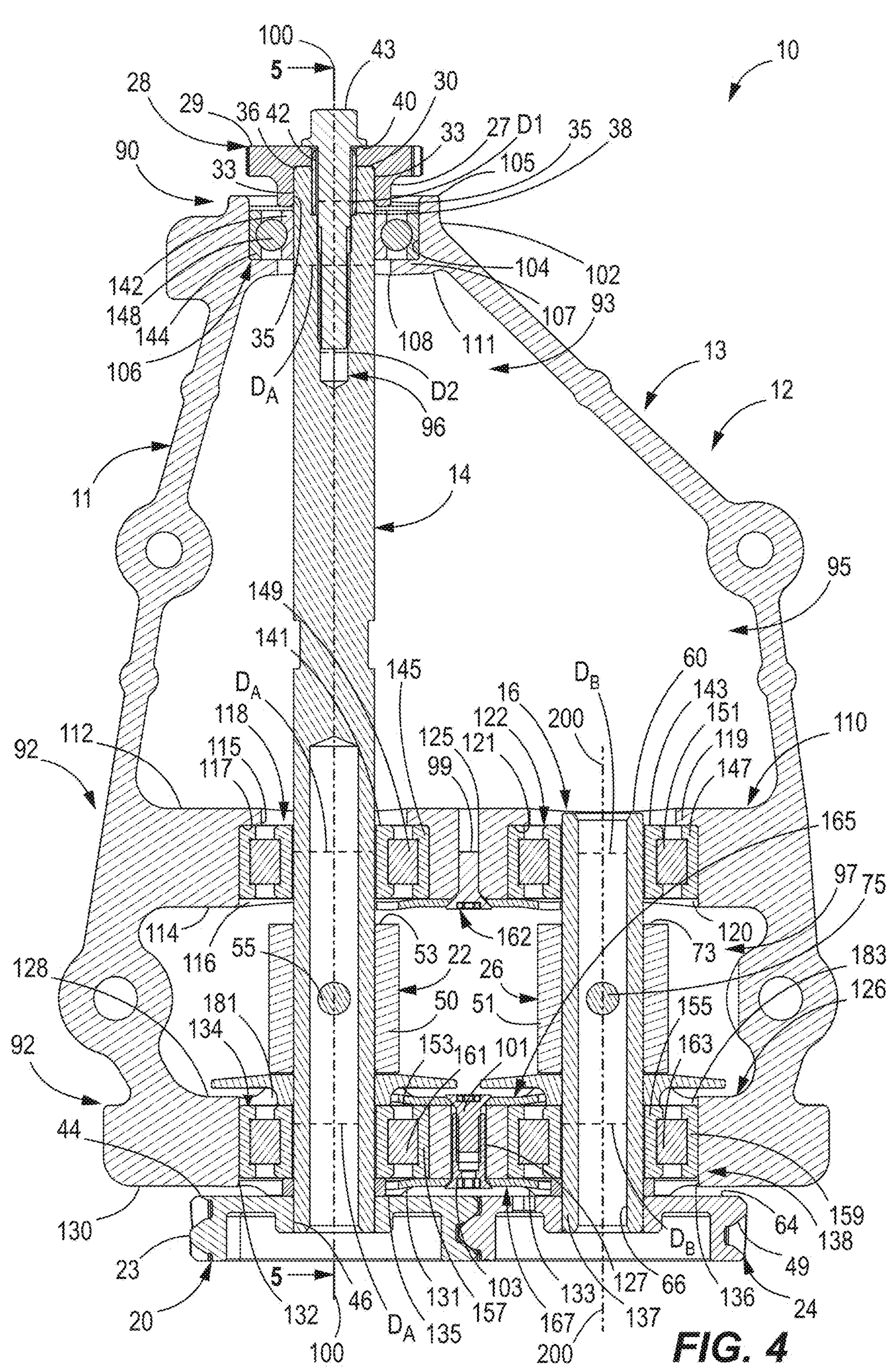
FIG. 4 is a view of Section 4-4, taken in FIG. 1.

Referring to FIGS. 3-4, the housing 12 has first and second frame elements 11, 13 that rigidly connect an upper bearing support portion 90, a middle bearing support portion 92, and a lower bearing support portion 94 displaced from each other axially with respect to the first rotational axis 100. A central brace 109 extends laterally between the first and the second frame elements 11, 13 and axially between the upper bearing support portion 90 and the middle bearing support portion 92 for additional structural stability and support. The housing 12 has an open framework that provides access to internal components of the counterbalancer 10, which advantageously allows for splash lubrication of the internal components, as will be described further below. A first window 93 is defined axially between the upper bearing support portion 90 and the central brace 109. A second window 95 is defined axially between the central brace 109 and the middle bearing support portion 92. A third window 97 is defined axially between the middle bearing support portion 92 and the lower bearing support portion 94.

The housing 12 has a series of openings 104, 116, 132 extending axially therethrough that together define a first rotational axis 100, and a separate series of openings 120, 136 extending axially therethrough that define a second rotational axis 200, whereby the second rotational axis 200 extends parallel to the first rotational axis 100. The housing 12 is constructed as a single piece that is inseparable about any and all of the openings 104, 116, 132, 120, 136. By way of non-limiting example, the housing 12 may be constructed from aluminum, or other non-ferrous material or alloy, which advantageously lowers production costs and lowers the overall weight of the housing. As will be described further herein below, the openings are each formed axially within surfaces of the housing 12 such that any element of the counterbalancer 10 that is placed or supported within these openings can only be positioned therein axially.

Figure 5:
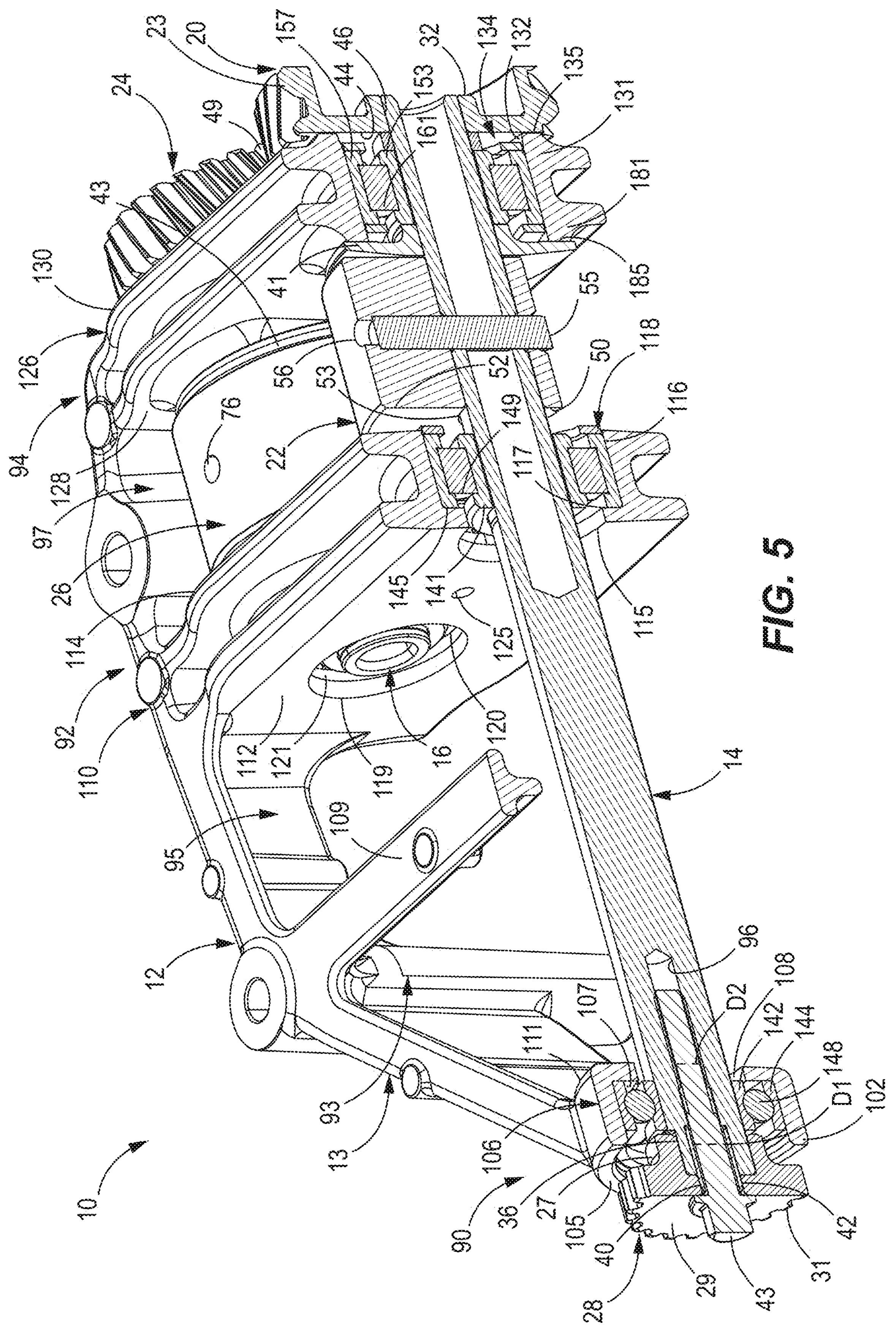
FIG. 5 is a view of Section 5-5, taken in FIG. 4.

Referring to FIGS. 4-5, the upper bearing support portion 90 is configured to support the roller bearing 106. By way of example, a deep groove ball bearing of standard size 6004 may be selected for combination of radial load bearing capacity and tolerance for angular misalignment. The upper bearing support portion 90 has a cylindrical body 102 which extends axially between an upper surface 105 and a lower surface 111. The cylindrical body 102 has a blind opening 104 which is defined within the upper surface 105. The blind opening 104 is cylindrical such that the cylindrical body 102 and the blind opening 104 are coaxial with the first rotational axis 100. A through-bore 108 extends from the blind opening 104 through the lower surface 111 on the first rotational axis 100. The blind opening 104 and the through-bore 108 define a lip 107 which protrudes radially inward with respect to the first rotational axis 100. The lip 107 is configured to support the roller bearing 106 within the blind opening 104 such that the roller bearing 106 is coaxial with the first rotational axis 100, and to prevent axial movement of the roller bearing 106 past the lip 107.

The roller bearing 106 is a ball bearing that has an inner race 142 and an outer race 146 with rotary elements 148 positioned therebetween to reduce relative friction between the inner race 142 and the outer race 146 as the inner race 142 is rotated by the first shaft 14. The outer race 146 has an outer diameter which is slightly larger than an inner diameter of the blind opening 104 such that the roller bearing 106 can be secured axially within the cylindrical body 102 with an interference fit. The inner race 142 has an inner diameter which is slightly smaller than the outer diameter of the first shaft 14, such that the first shaft 14 can be secured with respect to the roller bearing 106 with an interference fit, as will be described further herein. The first shaft 14 may be configured such that an outer diameter $D_A$ (shown in FIG. 4) of the first shaft 14 is greatest where the first shaft 14 extends through the roller bearings 106, 118, 134, such that the interference fit is secure.

Referring to FIG. 4, the middle bearing support portion 92 has a shelf 110 which extends between the first and the second frame elements 11, 13 and is configured to support the roller bearings 118, 122. The middle bearing support portion 92 further includes a retainer clip 162 for securing the roller bearings 118, 122 axially with respect to the middle bearing support portion 92.

The shelf 110 has an upper surface 112 and a lower surface 114. The shelf 110 has a first blind opening 116 which is defined within the lower surface 114. The first blind opening 116 is cylindrical such that the first blind opening 116 is coaxial with the first rotational axis 100. A through-bore 115 extends from the first blind opening 116 through the upper surface 112 on the first rotational axis 100. The first blind opening 116 and the through-bore 115 define a lip 117 which protrudes radially inward with respect to the first rotational axis 100. The shelf 110 has a second blind opening 120 which is cylindrical and defined within the lower surface 114 such that the second blind opening 120 is coaxial with the second rotational axis 200. A through-bore 119 extends from the second blind opening 120 through the upper surface 112 on the second rotational axis 200. The second blind opening 120 and the through-bore 119 define a lip 121 which protrudes radially inward with respect to the second rotational axis 200. A hole 125 extends through the shelf 110 parallel to the first rotational axis 100. The hole 125 is positioned midway between the first rotational axis 100 and the second rotational axis 200.

The roller bearings 118, 122 are each cylindrical rotary bearings which have an inner race 141, 143 and an outer race 145, 147, respectively, with a cylindrical roller 149, 151 extending therebetween. The roller bearings 118, 122 are configured such that friction is reduced between the inner race 141, 143 and the outer race 145, 147 as the inner race 141, 143 is rotated. By way of example, a cylindrical roller bearing of standard size NU2204 may be selected for high radial load capacity in compact size.

The outer race 143 has an outer diameter which is slightly larger than an inner diameter of the first blind opening 116 such that the roller bearing 118 can be secured axially within the shelf 110 with an interference fit. The outer race 147 has an outer diameter which is slightly larger than an inner diameter of the second blind opening 120 such that the roller bearing 122 can be secured axially within the shelf 110 with an interference fit.

The inner race 141 has an inner diameter which is slightly smaller than an outer diameter of the first shaft 14, such that the roller bearing 118 is secured axially onto the first shaft 14 with an interference fit, as will be described further herein. The inner race 143 has an inner diameter which is slightly smaller than the outer diameter of the second shaft 16 such that the roller bearing 122 is secured axially onto the second shaft 16 with an interference fit, as will be described further herein. The first shaft 14 may be configured such that an outer diameter $D_A$ (shown in FIG. 4) of the first shaft 14 is greatest where the first shaft 14 extends through the roller bearings 106, 118, 134, such that the interference fit is secure. The second shaft 16 may be configured such that an outer diameter $D_B$ (shown in FIG. 4) of the second shaft 16 is greatest where the second shaft 16 extends through the roller bearings 122, 138, such that the interference fit is secure.

Referring to FIGS. 3-4, the retainer clip 162 is configured to be secured to the lower surface 114 of the shelf 110 to prevent axial movement of the roller bearings 118, 122 within the housing 12. The retainer clip 162 has a mounting plate 168 and a pair of semi-circular biasing members 170 that extend from opposite sides of the mounting plate 168. A hole 171 extends through a center of the mounting plate 168. The semi-circular biasing members 170 each have a pair of arms 172 which extend circumferentially away from one another and from the mounting plate 168. The biasing members 170 are each shaped such that the pair of arms 172 have the same outer periphery as the roller bearings 118, 122 to which the retainer clip 162 is secured. The pair of arms 172 are bent away from the mounting plate 168 in the axial direction such that the biasing members 170 are pre-loaded and exert a bias onto the roller bearings 118, 122 when the retainer clip 162 is secured to the housing 12. The retainer clip 162 is secured to the lower surface 114 via a fastener 99 (e.g., a screw or bolt) which extends through the hole 171 and into the hole 125, which may be threaded. The retainer clip 162 is oriented such that the mounting plate 168 is positioned radially between the roller bearings 118, 122 and each of the biasing members 70 are aligned with one of each of the roller bearings 118, 122. On each side of the mounting plate 168, each of the pairs of arms 172 are bent toward the lower surface 114 such that the pair of arms 172 engage the outer races 145, 147 of the roller bearings 118, 122. When the retainer clip 162 is secured to the housing 12, the mounting plate 168 is secured flush to the lower surface 114 against the pre-loaded bias of the biasing members 170 to provide a secure engagement therebetween and to prevent axial movement of the roller bearings 118, 122.

The lower bearing support portion 94 has a shelf 126 that extends between the first and the second frame elements 11, 13 and is configured to support the roller bearings 134, 138. The lower bearing support portion 94 further includes retainer clips 165, 167 for securing the roller bearings 134, 138 axially with respect to the lower bearing support portion 94.

The shelf 126 has an upper surface 128 and a lower surface 130. The shelf 126 has a first opening 132 which is defined within the shelf 126. The first opening 132 is cylindrical such that the first opening 132 is coaxial with the first rotational axis 100. The first opening 132 extends fully through the upper and the lower surface 128, 130 of the shelf 126. The shelf 126 has a second opening 136 that is cylindrical and defined within the shelf 126 such that the second opening 136 is coaxial with the second rotational axis 200. The second opening 136 extends fully through the upper and the lower surface 128, 130 of the shelf 126, here having a consistent inner diameter therethrough. A hole 127 extends through the shelf 126 parallel to the first rotational axis 100. The hole 127 is positioned midway between the first rotational axis 100 and the second rotational axis 200. The hole 127 is configured for securing another retainer clip 162 to axially retain the roller bearings 134, 138 within the first opening 132 and the second opening 136, respectively. As shown in FIG. 3, the hole 127 is positioned within a recessed floor 139 defined in the upper surface 128 of the shelf 126. The recessed floor 139 is configured such that the retainer clip 162 is substantially flush with (or in certain examples, recessed relative to) the upper surface 128 so as to avoid interfering with weights rotating within the window 97, as discussed further below.

Figure 6:
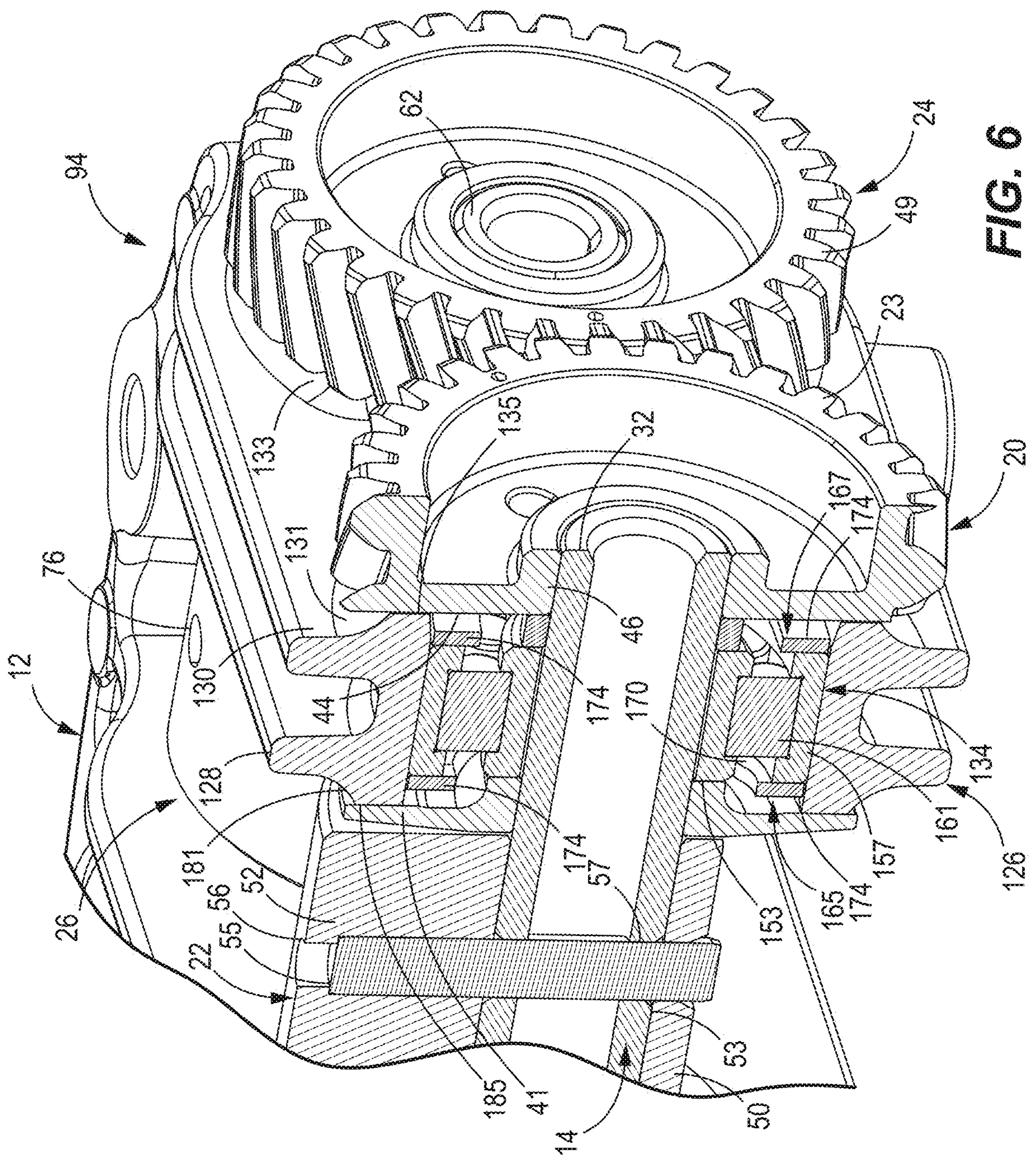
FIG. 6 is an alternate view of Section 5-5, showing a first and a second output gear and associated thrust pads.
Figure 7:
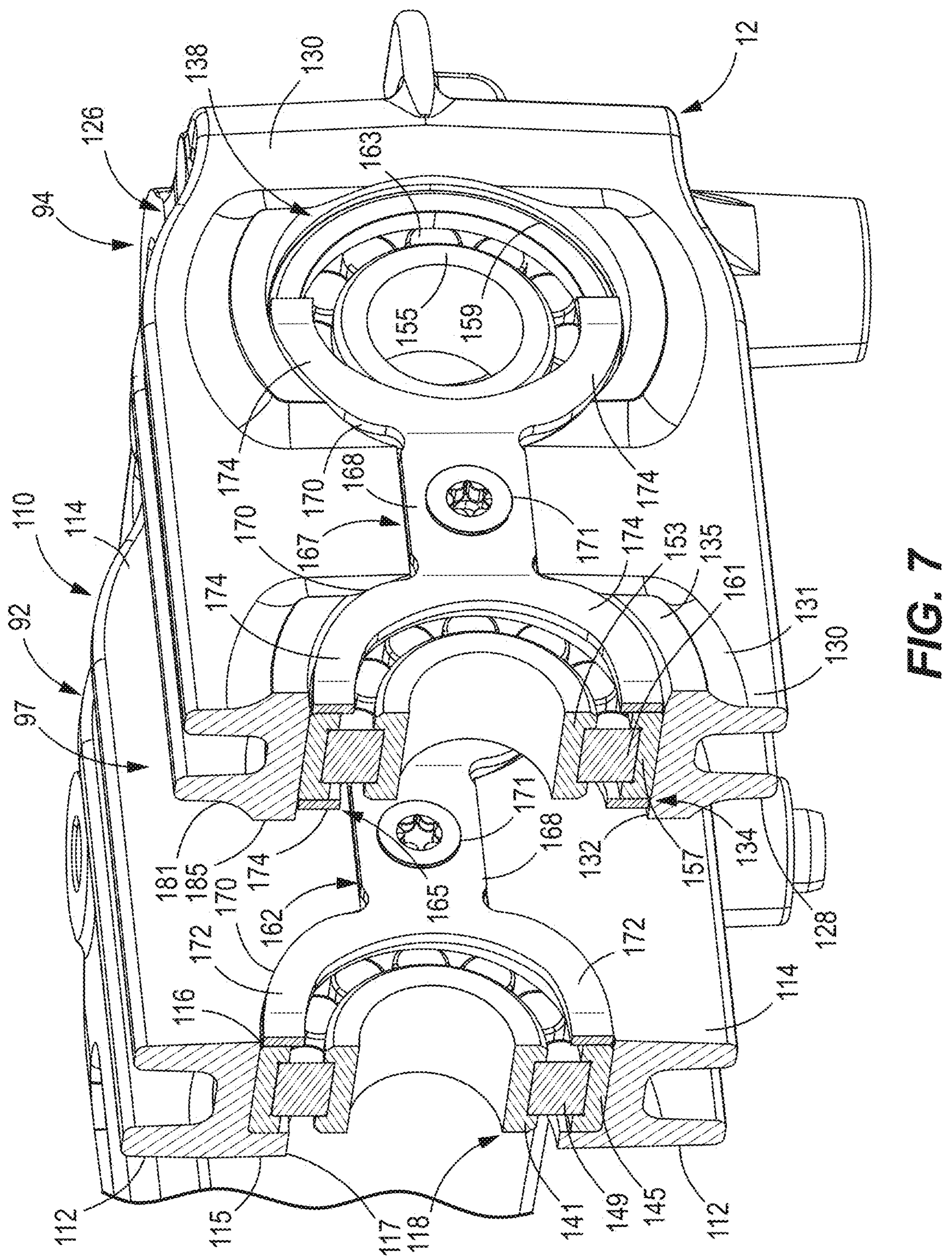
FIG. 7 is an alternate view of Section 5-5, showing rotary bearings and bearing retainer clips.
Figure 8:
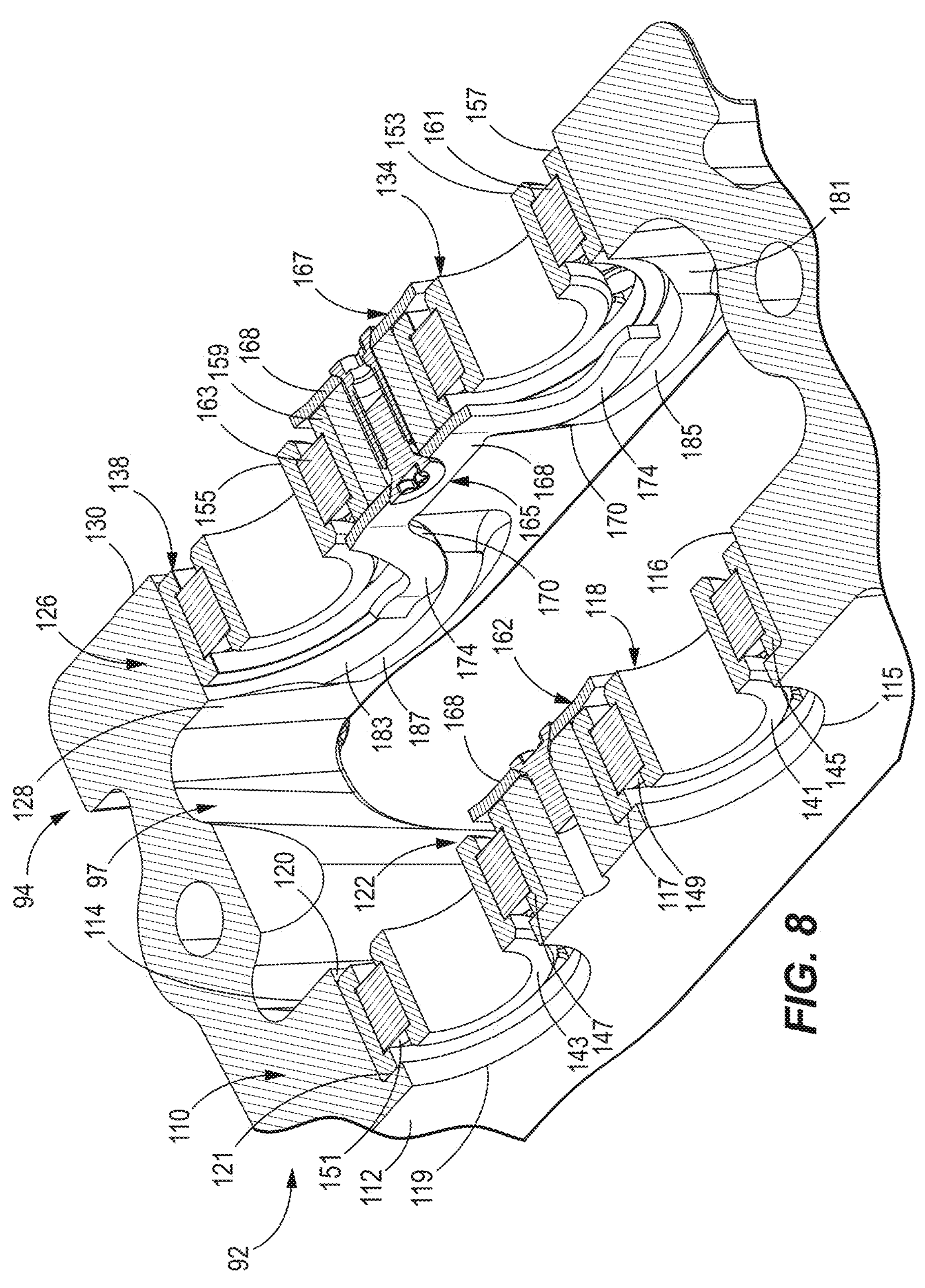
FIG. 8 is an alternate view of Section 5-5.

As best shown in FIG. 6, the upper surface 128 has a raised pads 181 that protrude from the upper surface 128 and extend around the first opening 132 and raised pads 183 that protrude from the upper surface 128 and extend around the second opening 136. The raised pads 181 have an outer surface 185 that may be machined such that the outer surface 185 has a reduced coefficient of friction relative to a surface adjacent thereto (e.g., the upper surface 128). The raised pads 183 have an outer surface 187 which may be machined such that the outer surface 187 has a reduced coefficient of friction relative to a surface adjacent thereto, as will be described further herein.

The lower surface 130 has raised pads 131 that protrude from the lower surface 130 and extend around the first opening 132 and raised pads 133 that protrude outward from the lower surface 130 and extend around the second opening 136. The raised pads 131 have an outer surface 135 which may be machined such that the outer surface 135 has a reduced coefficient of friction relative to a surface adjacent thereto. The raised pads 133 have an outer surface 137 which may be machined such that the outer surface 137 has a reduced coefficient of friction relative to a surface adjacent thereto, as will be described further herein. For each of the raised pads discussed herein, other techniques may be used to provide a reduced coefficient of friction, including chemical and/or heat treatment, use of other materials coupled to the housing, and/or the like.

The roller bearings 134, 138 are each cylindrical rotary bearings which have an inner race 153, 155 and an outer race 157, 159, respectively, with a cylindrical roller 161, 163 extending therebetween. By way of example, a cylindrical roller bearing of standard size NU2204 may be selected for high radial load capacity in compact size. The roller bearings 134, 138 are configured such that friction is reduced between the inner race 153, 155 and the outer race 157, 159 as the inner race 153, 155 is rotated.

The outer race 157 has an outer diameter which is slightly larger than an inner diameter of the first opening 132 such that the roller bearing 134 can be secured axially within the shelf 126 with an interference fit. The outer race 159 has an outer diameter which is slightly larger than an inner diameter of the second opening 136 such that the roller bearing 138 can be secured axially within the shelf 126 with an interference fit.

The inner race 153 has an inner diameter which is slightly smaller than an outer diameter of the first shaft 14, such that the roller bearing 134 is secured axially onto the first shaft 14 with an interference fit, as will be described further herein. The inner race 155 has an inner diameter which is slightly smaller than the outer diameter of the second shaft 16 such that the roller bearing 138 is secured axially onto the second shaft 16 with an interference fit, as will be described further herein. As described above, the first shaft 14 may be configured such that the outer diameter $D_A$(shown in FIG. 4) of the first shaft 14 is greatest where the first shaft 14 extends through the roller bearings 106, 118, 134, such that the interference fit is secure. The second shaft 16 may be configured such that the outer diameter $D_B$ (shown in FIG. 4) of the second shaft 16 is greatest where the second shaft 16 extends through the roller bearings 122, 138, such that the interference fit is secure.

The retainer clips 165, 167 are formed in the same way as the retainer clip 162, each having a mounting plate 168 and a pair of biasing members 170 which each have a pair of arms 172. The retainer clip 165 is positioned above the shelf 126 and oriented such that the pair of arms 172 are bent towards the upper surface 128 and each of the biasing members 170 engage with one of each of the roller bearings 134, 138. When the retainer clip 165 is secured to the housing 12, the mounting plate 168 is secured flush to the upper surface 128 against the pre-loaded bias of the biasing members 170 to provide a secure engagement therebetween. The retainer clip 167 is positioned beneath the shelf 126 and oriented such that the pair of arms 172 are bent towards the lower surface and each of the biasing members 170 engage with one of each of the roller bearings 134, 138, as described above in reference to the retainer clip 162. When the retainer clip 167 is secured to the housing 12, the mounting plate 168 is flush with the lower surface 130 against the pre-loaded bias of the biasing members 170 to provide a secure engagement therebetween and to prevent axial movement of the roller bearings 134, 138.

Returning to FIGS. 2-4, as described above, the first shaft 14 is configured to support the input gear 28, the first output gear 20, and the first weight 22 on the first rotational axis 100. The first shaft 14 extends axially between a first end 30 and a second end 32, such that the input gear 28 is non-rotatably coupled to the first end 30 and the first output gear 20 is non-rotatably coupled to the second end 32. The first weight 22 is positioned axially between the input gear 28 and the first output gear 20. The first shaft 14 also includes a spacer ring 37 and a thrust collar 41 which are configured to maintain relative axial distancing between adjacent elements. The spacer ring 37 is positioned between the roller bearing 118 and the first weight 22. The thrust collar 41 is positioned between the first weight 22 and the roller bearing 134.

Referring to FIGS. 3-5, the first shaft 16 has a blind bore 96 that extends axially into the first end 30 on the first rotational axis 100. The blind bore 96 has an annular ledge 38 such that a first inner diameter D1 and a second inner diameter D2 are defined therein, such that the first inner diameter D1 is greater than the second inner diameter D2. The first shaft 14 also has a hole 57 that extends radially through the first shaft 14 near the second end 32.

The input gear 28 has an upper face 29 with sprocket teeth 31 protruding radially outward therefrom. 4. A hub 27 protrudes axially downward from the upper face 29 and has an opening 36 defined therein for receiving the first end 30 of the first shaft 14. The opening 36 has diametrically opposed flats 33 for engaging with corresponding flats 35 (see FIG. 3) on the first shaft 14 for preventing relative rotation therebetween. A through-bore 40 extends through the upper face 29 and the opening 36. The through-bore 40 has an inner diameter that is substantially equal to the first inner diameter D1. In the illustrated figures, the input gear 28 is a sprocket gear which has teeth for engaging with a corresponding output gear of the engine, although this configuration is not limiting. The input gear 28 may be any type of rotatable gear which can be rotated via the engine to cause subsequent rotation of the first shaft 14 and the first output gear 20.

As shown in FIG. 4, a fastener 34 extends through the through-bore 40 and into the blind bore 96 to secure the input gear 28 to the first shaft 14. A bushing 42 is secured to the fastener 34 and spans between the through-bore 40 and where the blind bore 36 has the first inner diameter D1 to provide a secure fastening therebetween. By way of example, a hollow dowel of standard size M11 may be used.

With continued reference to FIGS. 3-5, the first output gear 20 is a helical gear that has angled teeth 23 configured to interface with oppositely-handed teeth of the second output gear 24, as will be described further herein. In the depicted example, the first output gear 20 is a right-handed helical gear, while the second output gear 24 is a left-handed helical gear, although this configuration is not limiting. The first output gear 20 has an upper face 44 through which a central bore 46 extends axially. The upper face 44 may be machined, processed, and/or the like such that the upper face 44 has a reduced coefficient of friction relative to a surface adjacent to reduce a coefficient of friction between the upper face 44 and the housing 12 (e.g., relative to the upper face 44 or other parts of the first output gear 20), as will be described further herein. The central bore 46 is configured such that an inner diameter of the central bore 46 is slightly smaller than an outer diameter of the second end 32 of the first shaft 14 such that the first output gear 20 may be press-fit onto the first shaft 14 axially through the central bore 46.

The first weight 22 has a cylindrical body 50 and a through-bore 53 that extends coaxially through the cylindrical body 50. An arc-shaped flange 52 projects radially from the cylindrical body 50. A hole 56 extends radially from an outer face of the arc-shaped flange 52 inward through the cylindrical body 50. As shown in FIG. 4, the first weight 22 is positioned on the first shaft 14 such that the first shaft 14 extends axially through the through-bore 53. A dowel pin 55 extends through the hole 56, through the arc-shaped flange 52 and into the corresponding hole 57 in the first shaft 14 to non-rotatably secure the first weight 22 to the first shaft 14.

Referring again to FIGS. 2-3, the second shaft 16 is configured to support the second output gear 24, and the second weight 26 on the second rotational axis 200. The second shaft 16 extends axially between a first end 60 and a second end 62, such that the second output gear 24 is non-rotatably coupled to the second end 62. The second weight 26 is positioned on the second shaft 16 between the first end 60 and the second output gear 24. The second shaft 16 also has a hole 61 that extends radially through the second shaft 16 near the second end 62. The second shaft 16 also includes a spacer ring 39 and a spacer disk 43 which are configured to maintain relative axial distancing between adjacent elements. The spacer ring 39 is positioned between the roller bearing 122 and the second weight 26. The spacer disk 43 is positioned between the second weight 26 and the roller bearing 138.

Referring to FIGS. 3-4, the second output gear 24 is a left-handed helical gear which has angled teeth 49 that are configured to interface with the angled teeth 23 of the right-handed first output gear 20, as described above. The second output gear 24 has an upper face 64 through which a central bore 66 extends axially. The upper face 64 may be machined such that the upper face 64 has a reduced coefficient of friction relative to a surface adjacent thereto to reduce relative friction between the upper face 64 and the housing 12, as will be described further herein. The central bore 66 is configured such that an inner diameter of the central bore 66 is slightly smaller than an outer diameter of the second end 62 of the second shaft 16 such that the second output gear 24 may be press-fit onto the second shaft 16 axially through the central bore 66.

Referring still to FIGS. 3-4, the second weight 26 has a cylindrical body 51 which extends axially. A through-bore 73 extends axially through the cylindrical body 51. A arc-shaped flange 72 projects radially from the cylindrical body 51. A hole 76 extends radially from an outer face of the arc-shaped flange 72 inward through the cylindrical body 51. As shown in FIG. 4, the second weight 26 is positioned on the second shaft 16 such that the second shaft 16 extends axially through the through-bore 73. A dowel pin 75 extends through the hole 76, through the arc-shaped flange 72 and into the corresponding hole 61, in the second shaft 16 to non-rotatably secure the second weight 26 to the second shaft 16. Advantageously, the dowel pin may be an off the shelf component.

Figure 14:
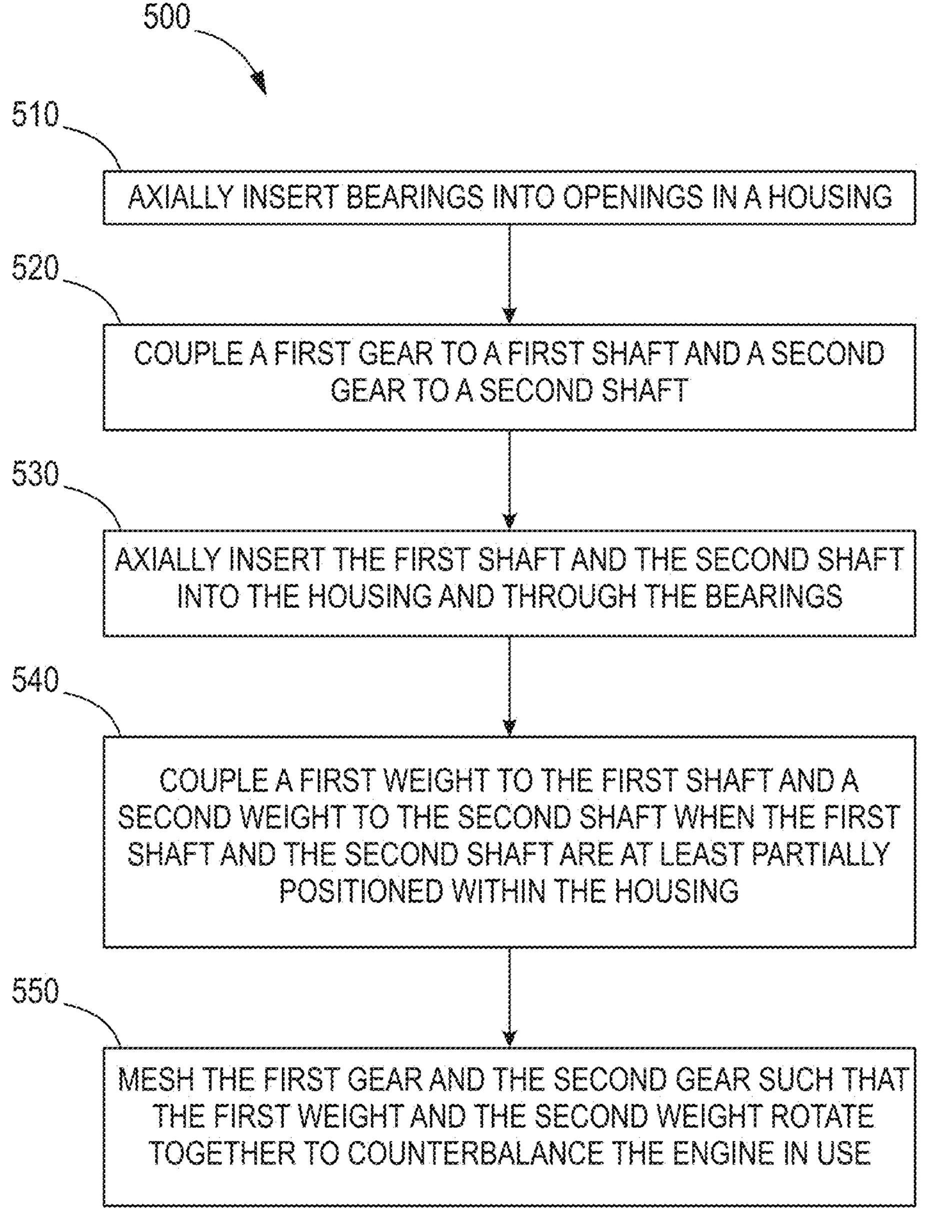
FIG. 14 is a flow chart of one example method for assembling a counterbalancer according to the present disclosure.

FIG. 14 shows a method 500 for assembling the counterbalancer 10. Referring FIG. 4 and FIG. 14, to assemble the counterbalancer 10, at step 510, the roller bearings 106, 118, 122, 134, 138 are inserted into their respective openings 104, 116, 120, 132, 136 in the housing 12. As described above, each of the roller bearings 106, 118, 122, 134, 138 are configured such that they can be press-fit into their respective openings 104, 116, 120, 132, 136. The roller bearing 106 is axially inserted into and press-fit into the blind opening 104 along the first rotational axis 100 until it abuts the lip 107. The roller bearing 118 is axially inserted and press-fit into the first blind opening 116 along the first rotational axis 100 until it abuts the lip 117. The roller bearing 122 is axially inserted and press-fit into the second blind opening 120 along the second rotational axis 200 until it abuts the lip 121. The roller bearing 134 is axially inserted and press-fit into the first opening 132 along the first rotational axis 100. The roller bearing 138 is axially inserted and press-fit into the second opening 136 along the second rotational axis 200. As described above, the housing 12 is inseparable about the openings 104, 116, 120, 132, 136 and as such, the roller bearings 106, 118, 122, 134, 138 can only be inserted axially into their respective openings 104, 116, 120, 132, 136.

The retainer clips 162, 165, 167 are then secured onto the housing 12 via their respective fasteners 99, 101, 103 to prevent axial movement of the roller bearings 106, 118, 122, 134, 138 relative to the housing 12. The retainer clip 162 is secured onto the lower surface 114 of the shelf 110 through the mounting plate 168 via the fastener 99. The fastener 99 passes through the hole 171 on the mounting plate 168 and into the hole 125 of the shelf 110. The retainer clip 162 is oriented such that each of the biasing members 170 are engaged with one of each of the roller bearings 118, 122 and each of the arms 174 are biased towards the lower surface 114 and engaged with diametrically opposed ends of the outer races 145, 147. The retainer clip 165 is secured onto the upper surface 128 of the shelf 126 through the mounting plate 168 via the fastener 101. The fastener 101 passes through the hole 171 on the mounting plate 168 and into the hole 127 of the shelf 126. The retainer clip 165 is oriented such that each of the biasing members 170 are engaged with one of each of the roller bearings 134, 138 and each of the arms 174 are biased towards the upper surface 128 and engaged with diametrically opposed ends of the outer races 157, 159. The retainer clip 167 is secured onto the lower surface 130 of the shelf 126 through the mounting plate 168 via the fastener 103. The fastener 103 passes through the hole 171 on the mounting plate 168 and into the hole 127 of the shelf 126, where it engages with an inner diameter of the fastener 101. The retainer clip 167 is oriented such that each of the biasing members 170 are engaged with one of each of the roller bearings 134, 138 and each of the arms 174 are biased towards the lower surface 130 and engaged with diametrically opposed ends of the outer races 157, 159.

At step 520, the first shaft 14 and the second shaft 16 are coupled to the first output gear 20 and the second output gear 24. The second end 32 of the first shaft 14 is axially inserted and press-fit into the central bore 46 of the first output gear 20. The second end 62 of the second shaft 16 is axially inserted and press-fit into the central bore 66 of the second output gear 24.

To secure the first shaft 14 within the housing 12, the spacer ring 37, the first weight 22 and the thrust collar 41 are inserted radially through the window 97 and positioned such that the through-bore 53 is in coaxial alignment with the first rotational axis 100. At step 530, the first end 30 of the first shaft 14 is then inserted axially along the first rotational axis 100 through the inner races 153 of the roller bearing 134 in the shelf 126, through the thrust collar 41, through the through-bore 53 of the first weight 22 at step 540, through the spacer ring 37, through the inner races 141 of the roller bearing 118 in the shelf 110, and upward through the inner races 142 of the roller bearing 106 in the upper bearing support portion 90. The first weight 22 is axially positioned such that the hole 56 of the first weight 22 is axially aligned with the hole 57 on the first shaft 14, and the dowel pin 55 is inserted to prevent axial and radial movement therebetween.

The input gear 28 is then positioned over the upper bearing support portion 90 on the first rotational axis 100 and press-fit axially onto the first end 30. The input gear 28 is fixed to the first shaft 14 via the fastener 34 that extends axially through the through-bore 40 of the input gear 28 and the first end 30 of the first shaft 14, which prevents axial movement of the input gear 28 with respect to the first shaft 14. Insofar as the first weight 22 is positioned axially in between the shelf 110 of the middle bearing support portion 92 and the shelf 126 of the lower bearing support portion 94, removal of the first shaft 14 axially through the openings 104, 116, 132 is prevented. As shown in FIGS. 4 and 6, when the first shaft 14 is secured within the housing 12, the upper face 44 of the first output gear 20 is abbutingly engaged with the outer surface 135 of the raised pads 131 on the lower surface 130 of the shelf 126. The thrust collar 41 is abbutingly engaged with the outer surface 185 of the raised pads 181 on the upper surface 128 of the shelf 126.

To secure the second shaft 16 within the housing 12, the spacer ring 39, the second weight 26 and the spacer disk 43 are radially inserted through the window 97 and positioned such that the through-bore 73 is in coaxial alignment with the second rotational axis 200. At step 530, the first end 60 of the second shaft 16 is then inserted axially along the second rotational axis 200 through the inner races 155 of the roller bearing 138 in the shelf 126, through the spacer disk 43, through the through-bore 73 of the second weight 26 at step 540, through the spacer ring 39, and upward through the inner races 143 of the roller bearing 122 in the shelf 110. The second weight 26 is axially positioned such that the hole 76 of the second weight 26 is axially aligned with the hole 61 on the second shaft 16, and the dowel pin 75 is inserted to prevent axial and radial movement therebetween. Insofar as the second weight 26 is positioned axially in between the shelf 110 of the middle bearing support portion 92 and the shelf 126 of the lower bearing support portion 94, removal of the second shaft 16 axially through the openings 120, 136 is prevented. When the second shaft 16 is secured within the housing 12, the upper face 64 of the second output gear 24 is abbutingly engaged with the outer surface 137 of the raised pads 133 on the lower surface 130 of the shelf 126. The spacer disk 43 is abbutingly engaged with the outer surface 187 of the raised pads 183 on the upper surface 128 of the shelf 126. At step 550, when both the first shaft 14 and the second shaft 16 are secured within the housing 12, the angled teeth 23 of the first output gear 20 are meshed with the angled teeth 49 of the second output gear 24.

During use, the input gear 28 is configured to be engaged with an output gear of the engine (not shown). The input gear 28 is non-rotatably coupled to the first shaft 14 such that rotation of the input gear 28 rotates the first shaft 14, which in turn rotates the first weight 22 and the first output gear 20. The first output gear 20 is meshed with the second output gear 24. The second output gear 24 is non-rotatably coupled to the second shaft 16 such that rotation of the second output gear 24 rotates the second shaft 16, which in turn rotates the second weight 26. As is conventional in counterbalancers 10, the rotation of the first and the second shaft 14, 16 causes rotation of the first and the second weight 22, 26 are rotated, which in turn counteracts the vibrational output of the engine.

Referring now to FIG. 6, the first output gear 20 and the second output gear 24 are both helical gears, and as such, acceleration and deceleration of the rotation of the first and the second output gears 20, 24 produces an axial thrust force relative to the first and the second rotational axes 100, 200. Deceleration of the first and the second output gears 20, 24 produces an axial thrust force that forces the upper face 44, 64 of the first and the second output gears 20, 24 into forceful engagement with the outer surface 135, 137 of the raised pads 131, 133 on the lower surface 130 of the shelf 126. Acceleration of the first and the second output gears 20, 24 produces an axial thrust force in the opposite direction form that of acceleration, which forces the thrust collars 41, 43 into forceful engagement with the outer surface 185, 187 of the raised pads 181, 183 on the upper surface 128 of the shelf 126. As described above, the outer surfaces 135, 137, 185, 187 of the raised pads 131, 133, 181, 183 and the upper faces 44, 64 of the first and the second output gears 20, 24 are machined to have a reduced coefficient of friction relative to a surface adjacent thereto to reduce relative friction therebetween.

Figures 9, 10:
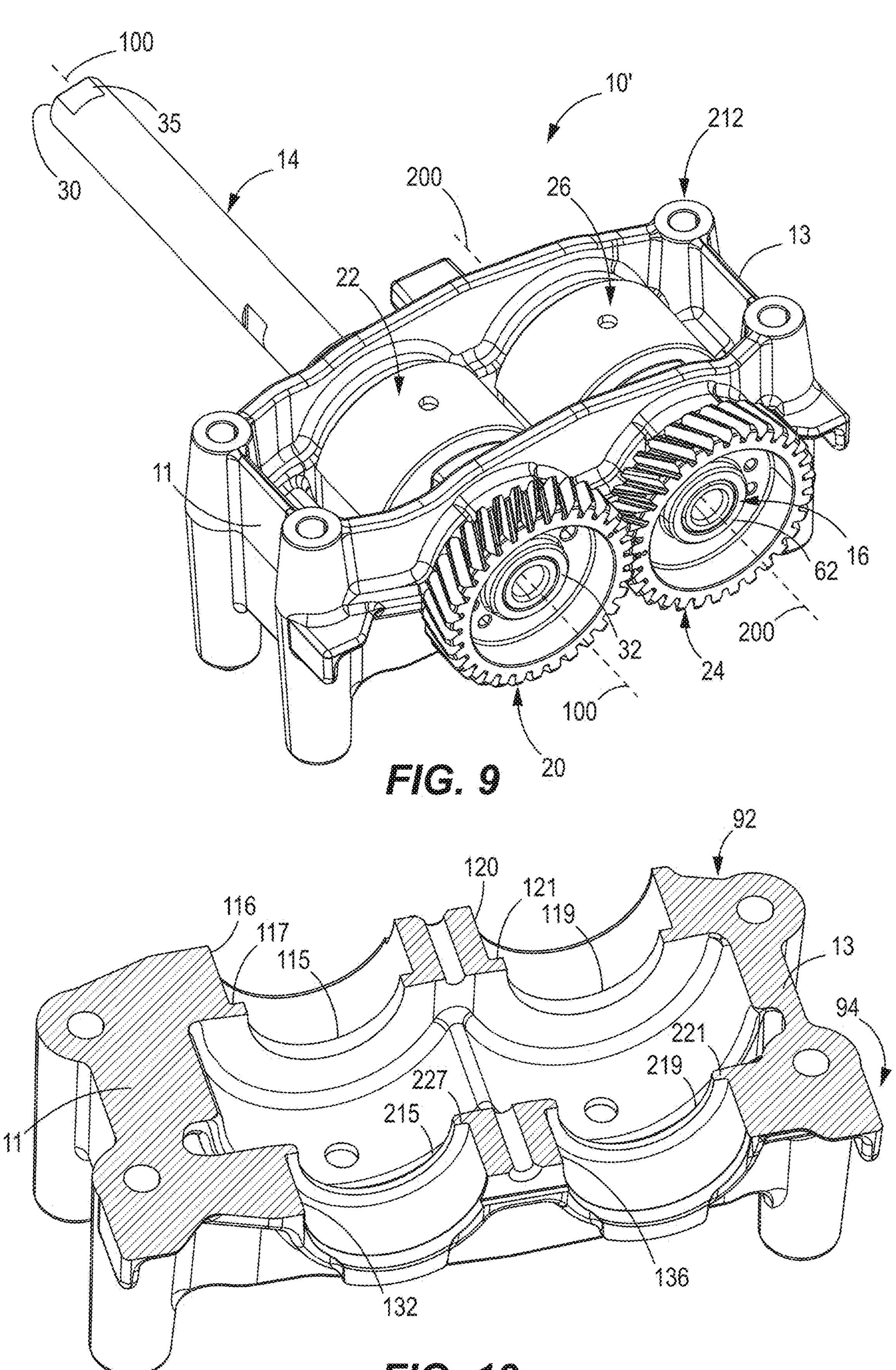
FIG. 9 is a perspective view of a counterbalancer according to an alternate embodiment of the present disclosure.
FIG. 10 is a view of Section 10-10, taken along the line A-A in FIG. 9.

The present disclosure contemplates other embodiments for counterbalancers that also provide advantages over those known in the art, as discussed above. With concurrent reference to FIG. 1, FIG. 9 depict an alternate embodiment of a counterbalancer 10'. The counterbalancer 10' includes an alternate housing 212 that does not include an upper bearing support portion as described in reference to FIG. 1. For brevity, components of the counterbalancer 10' that could be the same or similar to those of the counterbalancer 10 described above may be described and labeled with like-reference numbers. The housing 212 is configured to rotatably support a first shaft 14 and a second shaft 16 via roller bearings 118, 122, 134, 138. The first shaft 14 is configured to non-rotatably support an input gear 28, a first output gear 20 and a first weight 22. The second shaft 16 is configured to non-rotatably support a second output gear 24 and a second weight 26. The roller bearings 118, 122, 134, 138 are secured to the housing 12 via retainer clips 162, 165, 167. The counterbalancer 10' further includes an upper bearing support bracket 290 that is attached to the first shaft 14 separately from the housing 212 and is configured to support the first shaft 14 relative to a crankcase 280 of the engine. The upper bearing support bracket 290 rotatably supports the first shaft 14 via a roller bearing 106 which is secured therein via a top-hat bushing 260, as will be described further herein.

Referring to FIG. 10, which is a sectional view taken through the single-piece housing shown in FIG. 9, the housing 212 has first and second frame elements 11, 13 that rigidly connect a middle bearing support portion 92 and a lower bearing support portion 94. The housing 212 has a series of openings 116, 132 which define a first rotational axis 100 and a separate series of openings 120, 136 which define a second rotational axis 200 that extends parallel to the first rotational axis 100. The housing 12 may be constructed from aluminum, or other non-ferrous material, which advantageously lowers production costs and lowers the overall weight of the housing.

Referring to FIGS. 9-10, as described in reference to FIG. 1, the middle bearing support portion 92 has a shelf 110 with a first blind opening 116 defined therein for supporting the roller bearing 118. A through-bore 115 is defined coaxially through the first blind opening 116 and defines a lip 117. The shelf 110 has a second blind opening 120 defined therein for supporting the roller bearing 122. A through-bore 119 is defined coaxially through the second blind opening 120 and defines a lip 121.

The lower bearing support portion 94 has a shelf 126 with a first opening 132 defined therein for supporting the roller bearing 134. A through-bore 215 is defined coaxially through the first opening 132 and defines a lip 227. The shelf 126 has a second opening 136 defined therein for supporting the roller bearing 138. A through-bore 219 is defined coaxially through the second opening 136 and defines a lip 221.

Figure 11:
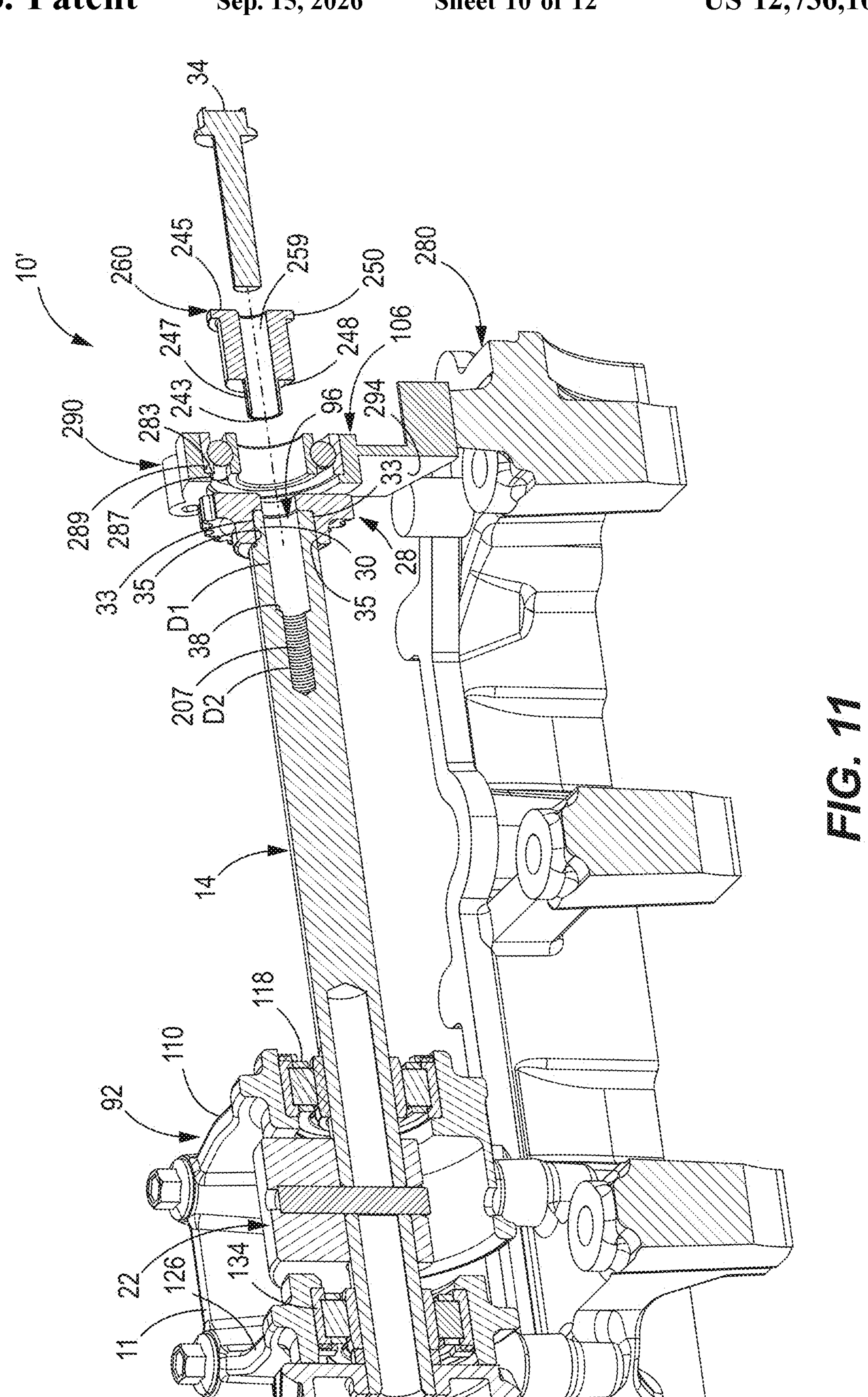
FIG. 11 is a view of Section 11-11, taken along the line B-B in FIG. 9.

Referring now to FIG. 11, the first shaft 14 extends axially between a first end 30 and a second end 32, such that the input gear 28 is non-rotatably coupled to the first end 30 and the first output gear 20 is non-rotatably coupled to the second end 32. The first weight 22 is positioned axially between the input gear 28 and the first output gear 20.

Referring to FIG. 9, the first shaft 16 has a blind bore 96 which extends axially into the first end 30 on the first rotational axis 100. The blind bore 96 has an annular ledge 38 such that a first inner diameter D1 and a second inner diameter D2 are defined therein, such that the first inner diameter D1 is greater than the second inner diameter D2. The portion of the blind bore 96 which has the second inner diameter D2 has internal threads 207. A pair of diametrically opposed flats 33 are defined in the first end 30 of the first shaft 14. The first shaft 14 also has a hole 57 that extends radially through the first shaft 14 near the second end 32.

Figure 12:
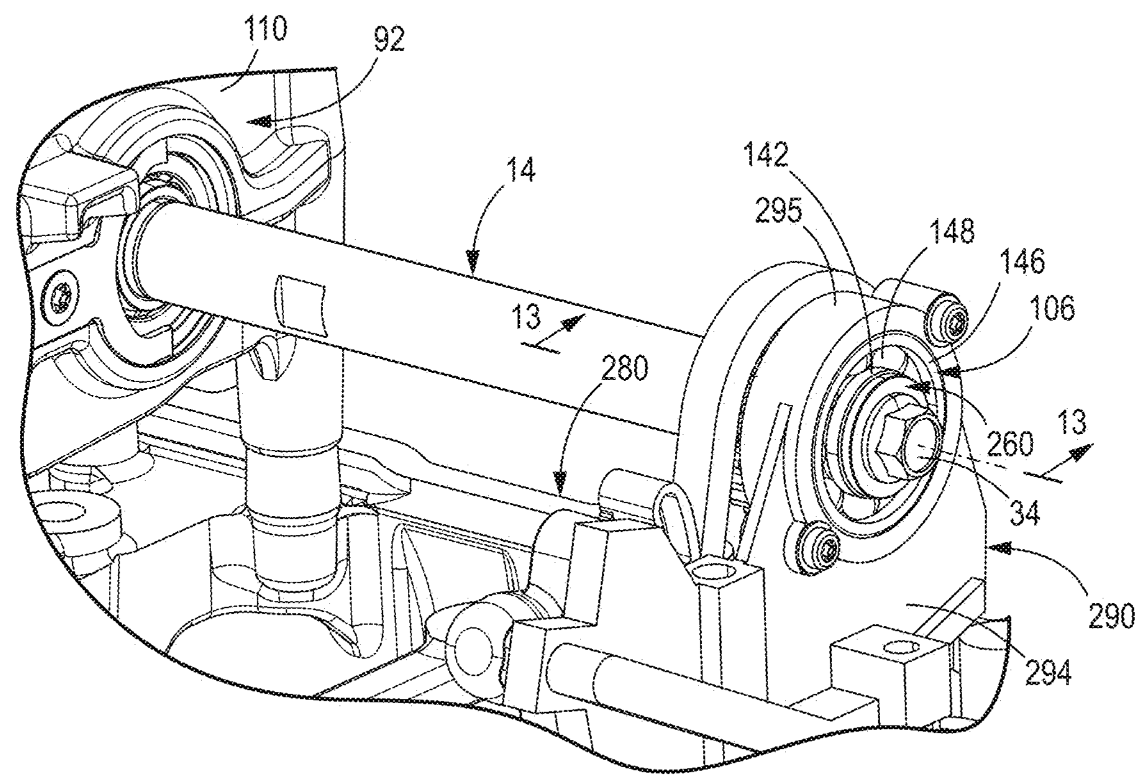
FIG. 12 is a partial perspective view of a modified tensioning bracket of the counterbalancer assembly.
Figure 13:
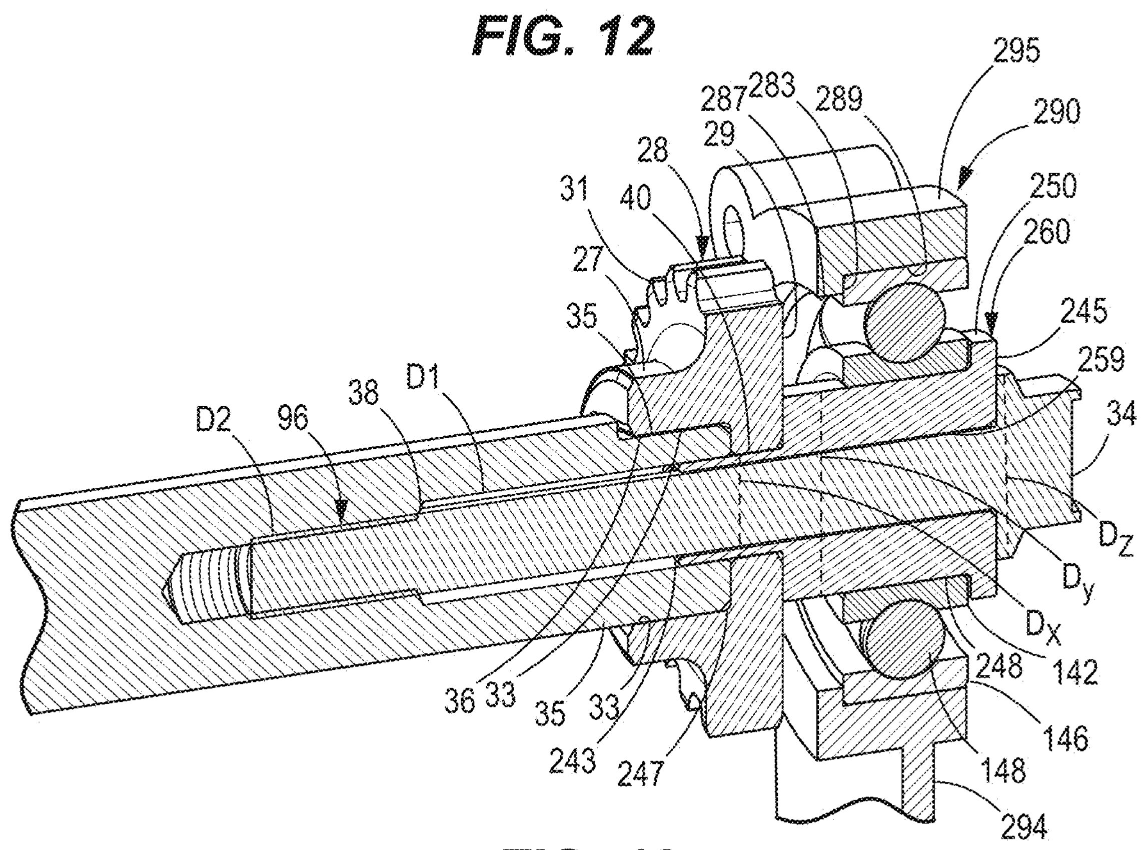
FIG. 13 is a view of Section 13-13, taken in FIG. 12.

As shown in FIG. 11-13, the input gear 28 has an upper face 29 with sprocket teeth 31 protruding radially outward therefrom. A hub 27 protrudes axially downward from the upper face 29 and has an opening 36 defined therein for receiving the first end 30 of the first shaft 14. The opening 36 has diametrically opposed flats 33 for engaging with corresponding flats 35 on the first shaft 14 for preventing relative rotation therebetween. A through-bore 40 extends through the upper face 29 and the opening 36. The through-bore 40 has an inner diameter which is equal to the first inner diameter D1.

The upper bearing support bracket 290 is configured to support a roller bearing 106, which rotatably supports the first end 30 of the first shaft 14 with respect to the crankcase 280. The upper bearing support bracket 290 has a bracket plate 294 with a cylindrical body 295 defined therein. The cylindrical body 295 has a blind opening 289 defined therein. The blind opening 289 is cylindrical such that the cylindrical body 295 and the blind opening 289 are coaxial. A through-bore 287 extends through the blind opening 289 coaxially with the cylindrical body 295, such that a lip 283 is defined. The bracket plate 294 is configured to be coupled to the engine (e.g., via fasteners such as bolts) in close proximity to an output gear (not shown) rotated thereby in operation, whereby the output gear engages with the input gear 28 of the counterbalancer 10'. The output gear of the engine and the input gear 28 may be directly meshed, or may be connected via a chain.

The roller bearing 106 is a ball bearing that has an inner race 142 and an outer race 146 with rotary elements 148 positioned therebetween to reduce relative friction between the inner race 142 and the outer race 146 as the inner race 142 is rotated by the first shaft 14. The outer race 146 has an outer diameter which is slightly larger than an inner diameter of the blind opening 289 such that the roller bearing 106 can be secured axially within the cylindrical body 295 with an interference fit.

The top-hat bushing 260 is shown. The top-hat bushing 260 is configured to fixedly couple the first shaft 14 and the input gear 28 to the upper bearing support bracket 290 such that the first shaft 14 is supported on the crankcase 280. The top-hat bushing 260 extends between a first end 243 and a second end 245. The bushing 260 has a central rod 247 which extends between the first end 243 and a head 250 at the second end 245. The central rod 247 has a through-bore 259 extending from the first end 243 through the head 250. The central rod 247 has an annular rim 248 which extends around the central rod 247 from a midpoint of the central rod 247 to the head 250. The central rod 247 has an outer diameter Dx (shown in FIG. 13) which is slightly larger than the first inner diameter D1 of the first shaft 14, such that the central rod 247 can be secured axially within the blind bore 96 of the first shaft 14 via an interference fit. The annular rim 248 has an outer diameter Dy (shown in FIG. 13) which is slightly larger than an inner diameter of the inner race 142 of the roller bearing 106, such that the top-hat bushing 260 can be press-fit into the roller bearing 106. The head 250 has an outer diameter $D_z$ (shown in FIG. 13) which is larger than the inner diameter of the inner race 142 such that the head 250 cannot move axially past the roller bearing 106.

When assembled, the first shaft 14 non-rotatably supports the input gear 28 along the rotational axis 100 such that the input gear 28 abuts a lower face of the cylindrical body 295. The first shaft 14 is aligned with the cylindrical body 295 of the upper bearing support bracket 290 such that the blind bore 96 is axially aligned with the through-bore 287. The roller bearing 106 is axially press-fit within the blind opening 289 of the cylindrical body 295 such that the roller bearing 106 is coaxial with the cylindrical body 295. The top-hat bushing 260 is then inserted axially along the rotational axis 100 such that the central rod 247 is press-fit within the blind bore 96 of the first shaft 14 and the through-bore 40 of the input gear 28 and the annular rim 248 is slip-fit within the inner race 142 of the roller bearing 106. The fastener 34 is then inserted into the through-bore 259 of the top-hat bushing 260 and extends through the top-hat bushing 260, through the roller bearing 106, through the input gear 28, and engages with the threads 207 of the blind bore 96 of the input shaft 14 to provide a secure attachment therebetween. In this manner, the fastener 34 and top-hat bushing 260 provide that the input shaft 14 and the roller bearing 106 are coupled to prevent axial and rotational movement relative to each other, with the upper bearing support bracket 290 rotatably supporting the input shaft 14 via the roller bearing 106 with the top-hat bushing 260 rotating therein.

The present inventors have recognized that the counterbalancers disclosed herein provide many advantages over those known in the art. Among these is the axially-based assembly process of using a single-piece housing, which in certain embodiments is possible in part by the shafts having consistent diameters along the lengths thereof. The windows in the single-piece housing also provide that the counterbalancer assembly can be lubricated via the same splash lubrication process as the crankcase, and simultaneously therewith. This splash-based lubrication requires less lubrication, and avoids the need to fill and seal lubricant within the housing. Moreover, the splash-based lubrication significantly reduces or eliminates windage losses of the components rotating, based on this reduction in volume and the rotation being in an open housing. A reduction in friction also provides for reduced oil temperatures, which improves performance and/or reliability while also decreasing the requirements for oil cooling.

The counterbalancers disclosed herein also eliminate sensitivity to bearing radial fit and crush to fastener preload, as the bearings are now retained via the clips (and other mechanisms described above) and can be inserted via a simple press-fit. Likewise, portions of the counterbalancer can be pre-assembled by similar interference fit, for example the gears on the shafts.

Moreover, the ability to use shafts having a simple, single outer diameter allows the use of simple round stock of near net shape to the finished part, rather than complex, extensive, and expensive machining processes.

The counterbalancers disclosed herein also allow for simple and cost-effective weights, which may be installed via off the shelf down pins.

The counterbalancers disclosed herein also permit the use of casted housings, which also may be formed of different materials than conventionally used. Through experimentation and development, the present inventors have recognized that it would be desirable to use an aluminum housing, which is lighter weight and cost effective. However, due to difference in thermal expansion between aluminum and other materials, such as steel bearings (which are desirable for their durability), conventional methods would not permit use of steel bearings within an aluminum housing as the different thermal expansion would result in the bearings loosening relative to the aluminum housing, thereby failing to function and leading to problems. However, when using the retainer clips discussed above, the bearings can be preloaded and held within the respective openings so as to remain in position despite differences in thermal expansion.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A counterbalancer for an engine, the counterbalancer comprising:

a housing;

a first shaft and a second shaft each positioned within the housing, wherein the first shaft is configured to be rotated by the engine in use;

a first gear and a first weight each non-rotatably coupled to the first shaft;

a second gear and a second weight each non-rotatably coupled to the second shaft, wherein the first gear and the second gear are meshed such that the first weight and the second weight rotate together to counterbalance the engine in use;

roller bearings rotatably supporting the first shaft and the second shaft within the housing; and retainer clips that prevent axial movement of the bearings within the housing.

2. The counterbalancer according to claim 1, wherein the housing defines an opening through which the first shaft extends, and wherein the housing is inseparable about the opening such that the first shaft is insertable only axially within the opening.

3. The counterbalancer according to claim 1, wherein the housing defines an opening within which a first bearing of the bearings is positioned for rotatably supporting the first shaft, and wherein the housing is inseparable about the opening such that the first bearing is insertable only axially within the opening.

4. The counterbalancer according to claim 1, wherein the housing defines openings through which the first shaft extends, and wherein the first weight is coupled to the first shaft between the opening and thus prevents the first shaft from being removed from the housing.

5. The counterbalancer according to claim 4, wherein one of the openings is a blind opening such that the housing limits axial movement of one of the bearings in one direction.

6. The counterbalancer according to claim 1, wherein the housing is ferrous.

7. The counterbalancer according to claim 1, wherein the housing comprises non-ferrous alloy.

8. The counterbalancer according to claim 1, wherein an outer diameter of the first shaft is greatest where the first shaft extends through one of the roller bearings for rotatable support.

9. The counterbalancer according to claim 1, wherein the first shaft is rotatably supported within the housing by three roller bearings of the roller bearings, and wherein the second shaft is rotatably supported by two roller bearings of the roller bearings.

10. The counterbalancer according to claim 1, further comprising a third gear non-rotatably coupled to the first shaft, wherein the third gear is configured to be rotated by the engine to thereby rotate the first shaft in use, and wherein the housing is axially positioned between the third gear and the first gear.

11. The counterbalancer according to claim 10, wherein the roller bearings include a ball bearing that rotatably supports the first shaft closer to the third gear than to the first gear, and a cylindrical bearing that rotatably supports the first shaft closer to the first gear than to the third gear.

12. The counterbalancer according to claim 1, wherein the housing comprises a plurality of raised pads configured to oppose axial thrust forces from a face of the first gear towards the housing during acceleration and/or deceleration of the first shaft.

13. The counterbalance according to claim 12, wherein the plurality of raised pads of the housing and/or the face of the first gear have a reduced coefficient of friction relative to a surface adjacent thereto to thereby reduce friction between the plurality of pads and the face of the first gear.

14. A counterbalancer for an engine, the counterbalancer comprising:
- a housing;
- a first shaft and a second shaft each positioned within the housing, wherein the first shaft is configured to be rotated by the engine in use;
- a first gear and a first weight each non-rotatably coupled to the first shaft;
- a second gear and a second weight each non-rotatably coupled to the second shaft, wherein the first gear and the second gear are meshed such that the first weight and the second weight rotate together to counterbalance the engine in use; and
- roller bearings rotatably supporting the first shaft and the second shaft within the housing, wherein outer diameters of the first shaft and the second shaft are greatest where the first shaft and the second shaft extend through the roller bearings, respectively.

15. The counterbalancer according to claim 14, wherein the housing is configured such that the roller bearings, the first shaft, and the second shaft are positionable therein only axially.

16. The counterbalancer according to claim 14, further comprising a third gear non-rotatably coupled to the first shaft, wherein the third gear is configured to be rotated by the engine to thereby rotate the first shaft in use, and wherein the housing is axially positioned between the third gear and the first gear.

17. A method for assembling a counterbalancer for an engine, the method comprising:
- axially inserting bearings into openings in a housing;
- coupling a first gear to a first shaft and a second gear to a second shaft;
- axially inserting the first shaft and the second shaft into the housing and through the bearings after the first gear and the second gear are coupled thereto, respectively;
- coupling a first weight to the first shaft and a second weight to the second shaft when the first shaft and the second shaft are at least partially positioned within the housing; and
- meshing the first gear and the second gear such that the first weight and the second weight rotate together to counterbalance the engine in use.

18. The method according to claim 17, further comprising coupling a third gear to the first shaft after the first shaft is inserted into the housing, wherein the third gear is configured to be operatively coupled to the engine to rotate the first shaft therethrough.

19. The method according to claim 18, wherein the housing is axially positioned between the third gear and the first gear.

20. The method according to claim 17, further comprising coupling retainer clips to the housing after the bearings are inserted therein to prevent axial movement of the bearings.

* * * * *